(12) United States Patent
Mahmoud et al.

(10) Patent No.: US 7,500,095 B2
(45) Date of Patent: Mar. 3, 2009

(54) CHIPSET-INDEPENDENT METHOD FOR LOCALLY AND REMOTELY UPDATING AND CONFIGURING SYSTEM BIOS

(75) Inventors: Samer El Haj Mahmoud, Austin, TX (US); Paul Dennis Stultz, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 395 days.

(21) Appl. No.: 11/375,766

(22) Filed: Mar. 15, 2006

(65) Prior Publication Data

US 2007/0220244 A1     Sep. 20, 2007

(51) Int. Cl.
    *G06F 9/00* (2006.01)
(52) U.S. Cl. .................. 713/2; 713/1; 713/100
(58) Field of Classification Search ........... 713/1, 713/2, 100
    See application file for complete search history.

(56) References Cited

U.S. PATENT DOCUMENTS

| 5,421,006 | A | 5/1995 | Jablon et al. | |
|---|---|---|---|---|
| 5,442,704 | A | 8/1995 | Holtey | |
| 5,465,299 | A | 11/1995 | Matsumoto et al. | |
| 5,530,828 | A | 6/1996 | Kaki et al. | |
| 5,671,229 | A | 9/1997 | Harari et al. | |
| 6,438,688 | B1 * | 8/2002 | Nunn ............................. | 713/2 |
| 6,671,802 | B1 | 12/2003 | Ott | |
| 6,732,267 | B1 * | 5/2004 | Wu et al. .................... | 713/100 |
| 7,203,831 | B2 * | 4/2007 | Wu et al. .................... | 713/100 |
| 7,363,482 | B2 * | 4/2008 | Zimmer et al. ................. | 713/2 |
| 2004/0088534 | A1 | 5/2004 | Smith et al. | |
| 2004/0205779 | A1 | 10/2004 | Almeida et al. | |
| 2004/0243863 | A1 | 12/2004 | Matsuoka | |
| 2004/0268106 | A1 | 12/2004 | Holmberg et al. | |
| 2005/0125652 | A1 | 6/2005 | Singer et al. | |
| 2006/0015861 | A1 | 1/2006 | Takata et al. | |
| 2007/0055968 | A1 * | 3/2007 | Rader ......................... | 717/168 |

FOREIGN PATENT DOCUMENTS

WO     WO 98/00846     1/1998

OTHER PUBLICATIONS

Search and Examination Report issued by the UK Intellectual Property Office on Jul. 12, 2007, Application No. GB0704921.6.
Search Report and Written Opinion issued by the Singapore Intellectual Property Office on May 16, 2008, Application No. 200701822-9.
Office Action issued by the State Intellectual Property Office of P.R. China in corresponding Chinese Patent Application No. 200710088322.6, Aug. 29, 2008.

* cited by examiner

*Primary Examiner*—Abdelmoniem Elamin
(74) *Attorney, Agent, or Firm*—Haynes and Boone, LLP

(57) ABSTRACT

For updating a basic input output system (BIOS) code stored in a non-volatile memory (NVM) included in an information handling system (IHS), a plurality of conditions permitting the updating of the BIOS stored in the NVM from a memory of the IHS are verified. The contents of the memory are preserved by disabling interrupts and disabling bus masters capable of causing a change in the contents of the memory. The BIOS stored in the NVM is updated from the memory. A user interface is provided to display status of the updating of the NVM to improve user experience. Upon completion of the updating the IHS is reset by enabling a cold reboot, thereby enabling the changes made to the BIOS to take effect.

15 Claims, 4 Drawing Sheets

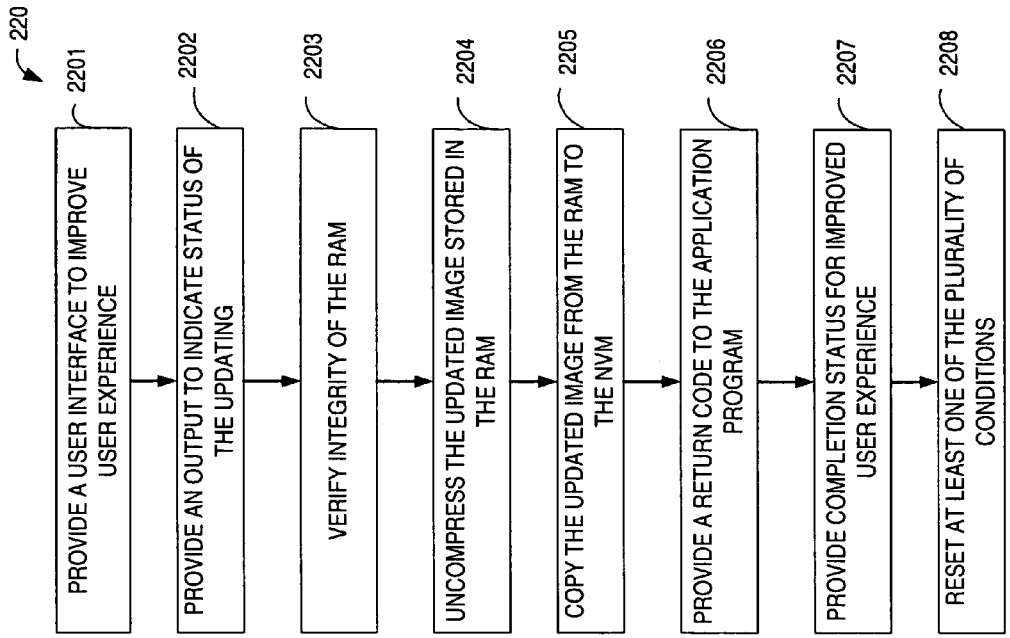
FIG. 2D
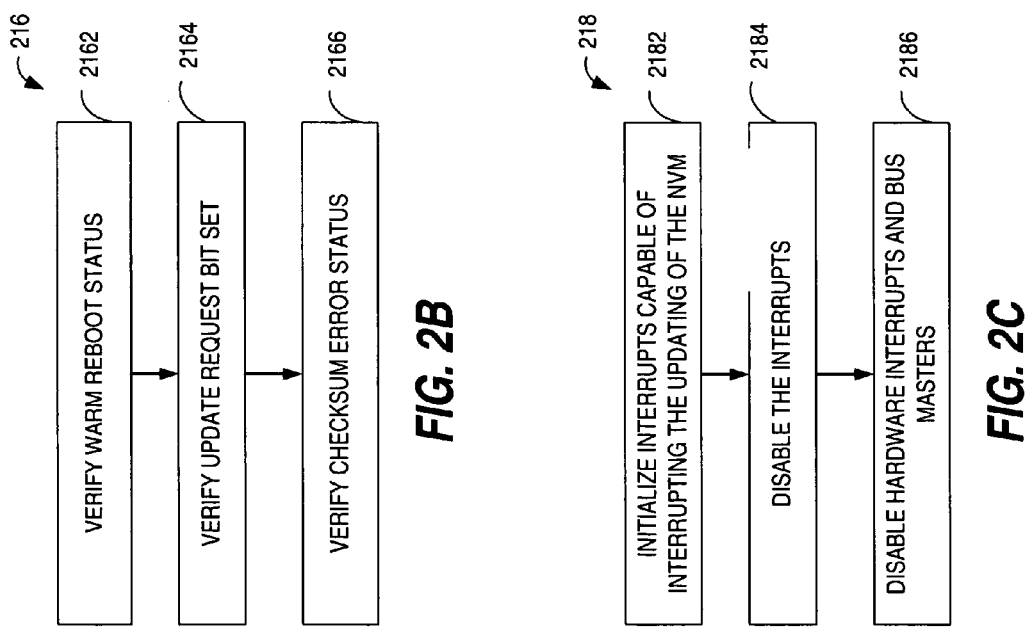
FIG. 2B
FIG. 2C

CHIPSET-INDEPENDENT METHOD FOR LOCALLY AND REMOTELY UPDATING AND CONFIGURING SYSTEM BIOS

BACKGROUND

The present disclosure relates generally to information handling systems, and more particularly to updating the basic input output system of an information handling system.

As the value and use of information continues to increase, individuals and businesses seek additional ways to acquire, process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, entertainment, and/or global communications. In addition, IHSs may include a variety of hardware and software components that may be configured to process, store, and communicate information and may include one or more computer systems, data storage systems, and networking systems.

A basic input/output system (BIOS) is generally a memory resident software program which includes instructions required to control computer peripherals such as the keyboard, display screen, disk drives, serial communications, and other functions without relying on a hard disk. The BIOS may be referred to as 'firmware' since it is typically stored in a non-volatile memory (NVM), e.g., flash memory. This ensures that the BIOS will be available to boot the system, even when there is a disk failure.

The BIOS also typically includes a SETUP code and a power-on-self-test (POST) program, both of which are well known to those skilled in the art. The SETUP code lets a user configure the computer system in a desired manner, e.g., by specifying whether certain features are enabled or disabled, and by specifying certain preferences. Computer system configuration generally refers to a process for setting, defining, and/or selecting hardware, software properties, parameters, or attributes of the system. The POST code tests and initializes various components, when the system is activated. Both the SETUP and POST codes are typically stored in NVM such as flash memory.

Presently, application software programs such as a remote BIOS update program (RBU) and/or a remote configuration interface (RCI) are available to update the BIOS either locally or remotely. The following U.S. patent describes various aspects of updating the BIOS remotely or locally, which is incorporated herein by reference: 1) U.S. Pat. No. 6,438,688 entitled 'Method And Computer For Locally And Remotely Updating A Basic Input Output System (BIOS) Utilizing One Update File'.

However, implementing a change or modification to the BIOS may be cumbersome since the BIOS code often needs to be modified depending on the limitations of a particular chipset deployed in the IHS. For example, memory initialization code may need to be modified for every chipset supported. Special BIOS code may be included to put memory circuits in self refreshing mode during the initialization. Additionally, some chipsets used in server designs may initialize memory after an internal bus reset, e.g., after a peripheral component interconnect (PCI) bus reset.

Therefore, a need exists to improve updating the NVM of an IHS. Accordingly, it would be desirable to provide for remotely or locally updating the BIOS code in manner that is independent of the limitations of a chipset, absent the disadvantages found in the prior methods discussed above.

SUMMARY

The foregoing need is addressed by the teachings of the present disclosure, which relates to updating an NVM of an IHS. According to one embodiment for updating a BIOS code stored in an NVM included in an IHS, a plurality of conditions permitting the updating of the BIOS stored in the NVM from a memory of the IHS are verified. The contents of the memory are preserved by disabling interrupts and disabling bus masters capable of causing a change in the contents of the memory. The BIOS stored in the NVM is updated from the memory. A user interface is provided to display status of the updating of the NVM to improve user experience. Upon completion of the updating the IHS is reset by enabling a cold reboot, thereby enabling the changes made to the BIOS to take effect.

Several advantages are achieved according to the illustrative embodiments presented herein. The embodiments advantageously provide for an improved automated technique to change contents of the NVM in a manner that is independent of a chipset, and limitations thereof, being utilized in the IHS. An application program, which may be executing locally in the IHS and/or may be executing at a remote location coupled to the IHS, is executable to change the contents of the NVM without having to modify the BIOS code for each specific chipset. The changes made to the BIOS take effect after a cold boot event of the IHS.

BRIEF DESCRIPTION OF THE DRAWINGS

FIG. 2B is a flow chart illustrating additional details of verifying a plurality of conditions described with reference to FIG. 2A, according to an embodiment.

FIG. 2C is a flow chart illustrating additional details of preserving contents of a RAM described with reference to FIG. 2A, according to an embodiment.

FIG. 2D is a flow chart illustrating additional details of updating the contents of a NVM from a RAM described with reference to FIG. 2A, according to an embodiment.

DETAILED DESCRIPTION

Figure 1:
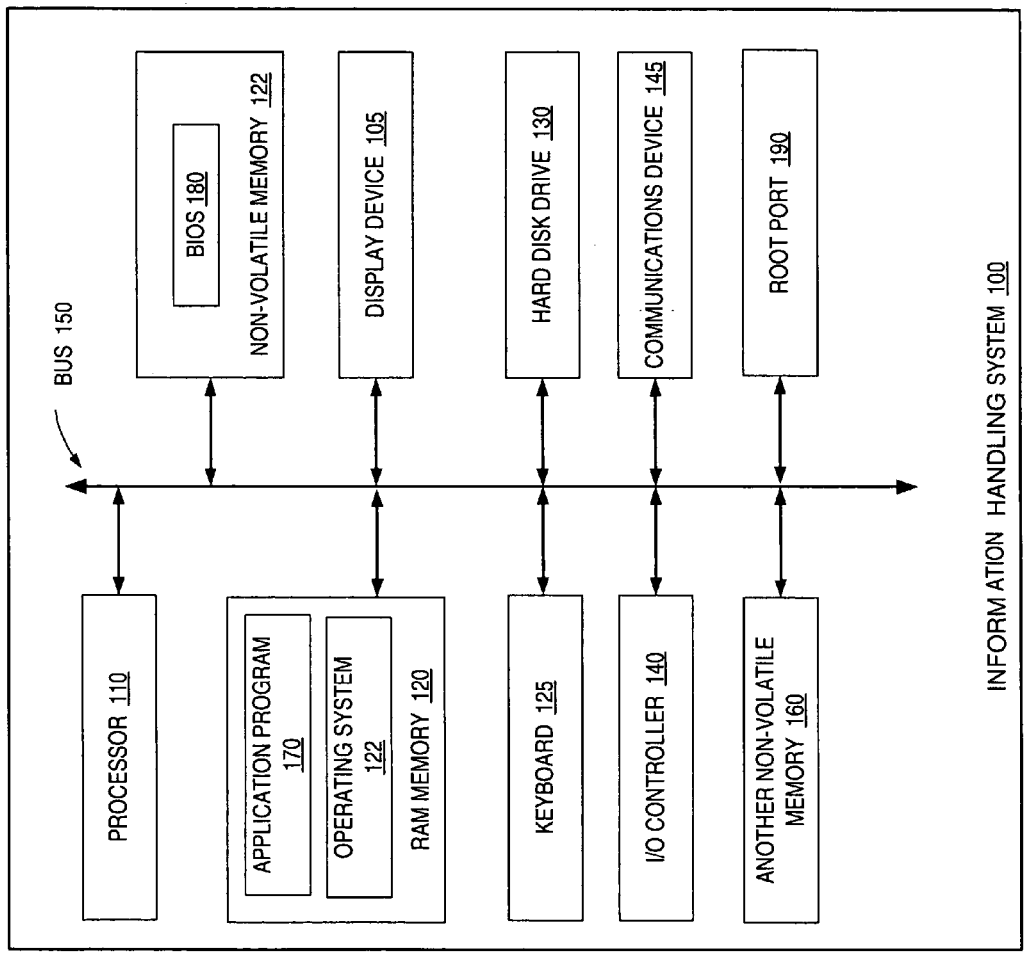
FIG. 1 illustrates a block diagram of an IHS, according to an embodiment.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices, boards, cards, modules, blocks, and/or components described herein may be implemented as hardware (including discrete components, integrated circuits and systems-on-a-chip 'SOC'), firmware (including application specific integrated circuits and programmable chips) and/or software or a combination thereof, depending on the application requirements.

Configuration—Describes a set up of a device and/or a system and refers to a process for setting, defining, or selecting hardware and/or software properties, parameters, or attributes of the device and/or the system. Certain types of new technologies such as plug-and-play may automatically configure the device.

BIOS code and/or configuration data for an IHS may need to be updated to enhance functionality and/or fix defects. A well known technique to provide the updates locally or remotely is to develop chipset specific BIOS code to workaround the limitations of the chipset. However, developing chipset specific BIOS increases developments costs and adds time delays in introducing new products. Thus, a need exists to provide for updating BIOS code that is independent of the chipset design.

According to one embodiment for updating a BIOS code stored in an NVM included in an IHS, a plurality of conditions permitting the updating of the BIOS stored in the NVM from a memory of the IHS are verified. The contents of the memory are preserved by disabling interrupts and disabling bus masters capable of causing a change in the contents of the memory. The BIOS stored in the NVM is updated from the memory. A user interface is provided to display status of the updating of the NVM to improve user experience. Upon completion of the updating, the IHS is reset by enabling a cold reboot, thereby enabling the changes made to the BIOS to take effect.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price. The IHS may include random access memory (RAM), one or more processing resources such as central processing unit (CPU) or hardware or software control logic, ROM, and/or other types of NVM. Additional components of the IHS may include one or more disk drives, one or more network ports for communicating with external devices as well as various input and output (I/O) devices, such as a keyboard, a mouse, and a video display. The IHS may also include one or more buses operable to receive/transmit communications between the various hardware components.

FIG. 1 illustrates a block diagram of an IHS 100, according to an embodiment. The IHS 100 includes a processor 110, a random access memory (RAM) 120 (also referred to as main memory), an NVM 122, a display device 105, a keyboard 125 and an I/O controller 140 for controlling various other I/O devices each coupled to a bus 150. For example, the I/O controller 140 may include a keyboard controller, a cursor device controller and/or the serial I/O controller. It should be understood that the term "information handling system" is intended to encompass any device having a processor that executes instructions from a memory medium.

In a particular embodiment, another or additional non-volatile memory (ANVM) 160, e.g., a battery backed CMOS memory, is coupled to the bus 150. The ANVM 160 is used to store IHS configuration data such as hard disk settings, devices and I/O ports, date and time settings, system security settings, start options, power management settings and similar others. In a particular embodiment, the ANVM 160 may be integrated into another memory device included in the IHS 100 such as the RAM 120. In a particular embodiment, a portion of the NVM 122 is used to store a BIOS 180. In a particular embodiment, a portion of the RAM 120 is used to store an application program 170. The application program 170 includes one or more instructions that are executable by the processor 110 to generate a new image for the BIOS 180, and hence for the NVM 122. In a particular embodiment, the new image is stored by the application program 170 in the RAM 120 prior to updating the BIOS 180 in the NVM 122. The application program 170 may be executed to update the NVM 122 locally or may be executed by a remote process executing on another IHS (AIHS) (not shown).

In a particular embodiment, the BIOS 180 includes code (also referred to as instructions), which is independent of a chipset used in the IHS 100 and which is executable to update the NVM 122 from the image stored in the RAM 120. Additional details of the updating of the NVM 122 from the RAM 120 are described with reference to FIG. 2.

The processor 110 communicates with the system components via the bus 150, which includes data, address and control lines. In one embodiment, the IHS 100 may include multiple instances of the bus 150. In an exemplary, non-depicted embodiment, not all devices shown may be directly coupled to the bus 150. The multiple instances of the bus 150 may be in compliance with one or more proprietary standards and/or one or more industry standards such as PCI, PCIe, ISA, USB, SMBus, and similar others. A communications device 145, such as a network interface card and/or a radio device, may be connected to the bus 150 to enable wired and/or wireless information exchange between the IHS 100 and other devices/systems (not shown) such as the AIHS. In a particular embodiment, the IHS 100 may include multiple instances of the processor 110, e.g., in a multicore, multiprocessor system.

The processor 110 is operable to execute the computing instructions and/or operations of the IHS 100. The memory medium, e.g., RAM 120, preferably stores instructions (also known as a "software program") for implementing various embodiments of a method in accordance with the present disclosure. An operating system (OS) 122 of the IHS 100 is a type of software program that controls execution of other software programs, referred to as the application software programs, e.g., the application program 170. In various embodiments the instructions and/or software programs may be implemented in various ways, including procedure-based techniques, component-based techniques, and/or object-oriented techniques, among others. The BIOS 180 is typically programmed in an assembly language. Software may also be implemented using C, XML, C++ objects, Java and Microsoft's .NET technology.

In a non-depicted, exemplary embodiment, the IHS 100 is operable in a plurality of operating modes such as a startup mode, an idle mode, a run-time mode, a safe mode and similar others. The IHS 100 may be described to be operating in a warm or a cold startup (or boot up) mode when executing BIOS code such as the SETUP and POST codes. The IHS 100 may exit the startup mode when the POST code execution is complete and control is transferred from the BIOS 180 to the operating system (OS) 122 of the IHS 100. The IHS 100 may be described to be operating in a run-time mode when the OS 122 is loaded and is operable to execute one or more application programs such as the application program 170.

Figure 2A:
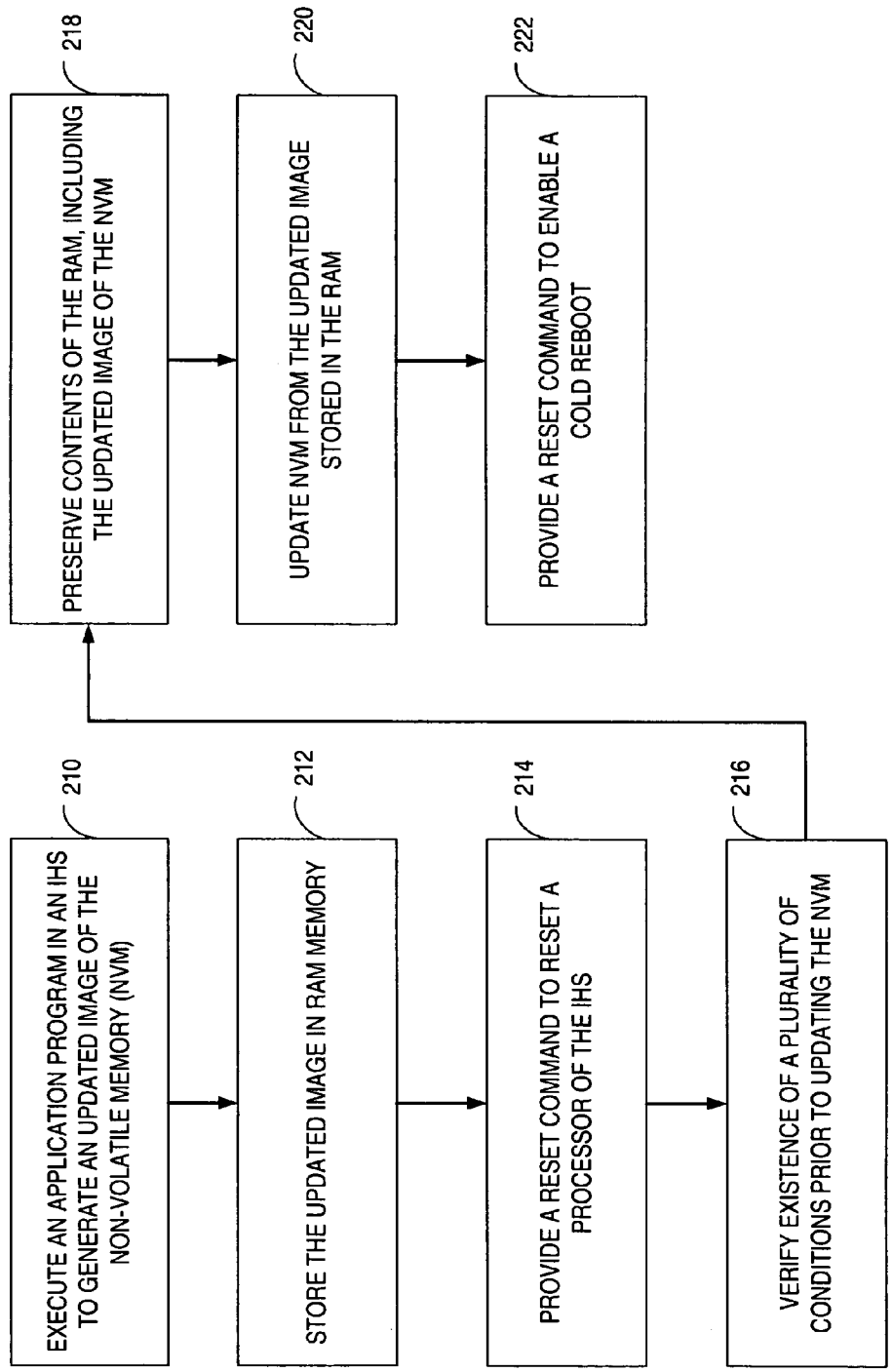
FIG. 2A is a flow chart illustrating a method for updating an NVM of an IHS, according to an embodiment.

FIG. 2A is a flow chart illustrating a method for updating an NVM of an IHS, according to an embodiment. In a particular embodiment, the NVM is substantially the same as the NVM 122 and IHS is substantially the same as the IHS 100 described with reference to FIG. 1.

At step 210, an application program such as the application program 170 is executed to generate an updated image of the BIOS 180 stored in the NVM 122. In a particular embodiment, a remote process and/or application program executing on another IHS, such as a central server, may be executed to generate the updated image. At step 212, the updated image generated locally or remotely is stored in the RAM 120 and an update request flag or bit is set in the ANVM 160. Setting the update request bit is indicative of a pending request to update the NVM 122. For example, an RBU program or an RCI may request an update of the BIOS by setting the update request flag. At step 214, a processor initialization command such as PROC_INIT is generated by the application program 170 to initiate the updating of the NVM 122. In a particular embodiment, in a multiprocessor system multiple processors may be reset by the processor initialization command. At step 216, a plurality of conditions are verified to be valid and/or set prior to the updating of the NVM 122 from the updated image. Additional details of the plurality of tests verified are described with reference to FIG. 2B.

At step 218, contents of the RAM 120 including the updated image are preserved and/or protected. Additional details of preserving the contents of the RAM 120 are described with reference to FIG. 2C. At step 220, the NVM 122 is updated from the updated image stored in the RAM 120. That is, contents of the updated image stored in the RAM 120 are copied to the BIOS 180 stored in the NVM 122. Additional details of updating the NVM 122 from the RAM 120 are described with reference to FIG. 2D. At step 222, the IHS 100 is reset by enabling a cold reboot. The cold reboot loads the updated image of the BIOS 180, thereby allowing the changes included in the update to take effect. In a particular embodiment, steps 216, 218, 220 and 222 are capable of being implemented in the BIOS 180.

FIG. 2B is a flow chart illustrating additional details of verifying a plurality of conditions described with reference to step 216 of FIG. 2A, according to an embodiment. At step 2162, a warm reboot status of the IHS 100 is verified. In a particular embodiment, the warm reboot status may be verified by reading a predefined memory location, e.g., a particular location in the RAM 120, and determining whether the contents of the predefined memory location match predefined data such as a predefined bit pattern. At step 2164, an update request bit set is verified to be set to a predefined state such as a logic '1'. The update request bit set is indicative of a pending request to update the NVM 122 from the RAM 120, as was described with reference to step 212 of FIG. 2A. In a particular embodiment, the update request bit set is stored in the ANVM 160 by the application program 170. At step 2166, a checksum error status of the ANVM 160 is verified to be free from errors to eliminate occurrence of a single bit error accidentally setting the update request bit.

FIG. 2C is a flow chart illustrating additional details of preserving the contents of the RAM 120 described with reference to step 218 of FIG. 2A, according to an embodiment. At step 2182, interrupts signals capable of interrupting the updating of the NVM 122 and/or the RAM 120 are initialized. In an exemplary, non-depicted embodiment, the initialization may include reinitializing an 8259 programmable interrupt controller (PIC), which handles the interrupt requests (IRQ's), and the interrupt vector table (IVT). At step 2184, the interrupts are disabled to prevent or avoid the interruption of the updating. At step 2186, a bus master device such as a PCI bus master and hardware interrupts are disabled.

FIG. 2D is a flow chart illustrating additional details of updating the contents of the NVM 122 from the RAM 120 described with reference to step 220 of FIG. 2A, according to an embodiment. At step 2201, a user interface is provided to improve user experience. In an exemplary, non-depicted embodiment, the user interface is a display such as the display device 105. The user interface is re-enabled and a video interrupt, e.g., INT 10h, is restored from the last boot. At step 2202, an output such as a display text message is generated to indicate a status of the updating of the NVM 122. At step 2203, integrity of the updated image stored in the RAM 120 is checked, e.g., by performing a checksum error on the RAM 120. At step 2204, the updated image stored in the RAM 120 is uncompressed. At step 2205, the updated image stored in the RAM 120 is copied to update the BIOS 180 stored in the NVM 122. At step 2206, a return code for the application program 170 is sent. The return code is indicative of whether the update to the BIOS 180 was completed with or without errors. At step 2207, a completion status output is provided to improve the user experience. The completion status output is indicative of whether the update to the BIOS 180 was completed with or without errors. At step 2208, at least one of the plurality of indications described with reference to step 216 of FIG. 2A is reset. In a particular embodiment, the update request bit set is cleared or set to a predefined state such as a logic '0'.

With reference to FIGS. 2A, 2B, 2C and 2D various steps described above may be added, omitted, combined, altered, or performed in different orders. For example, in a particular embodiment, with reference to FIG. 2A, an additional step may be added before step 210 to provide an uninterruptible power supply (UPS) to the IHS 100. The UPS may advantageously insure the completion of the updating task of the BIOS 180 in the event of a power failure during the NVM updating process.

Figure 3:
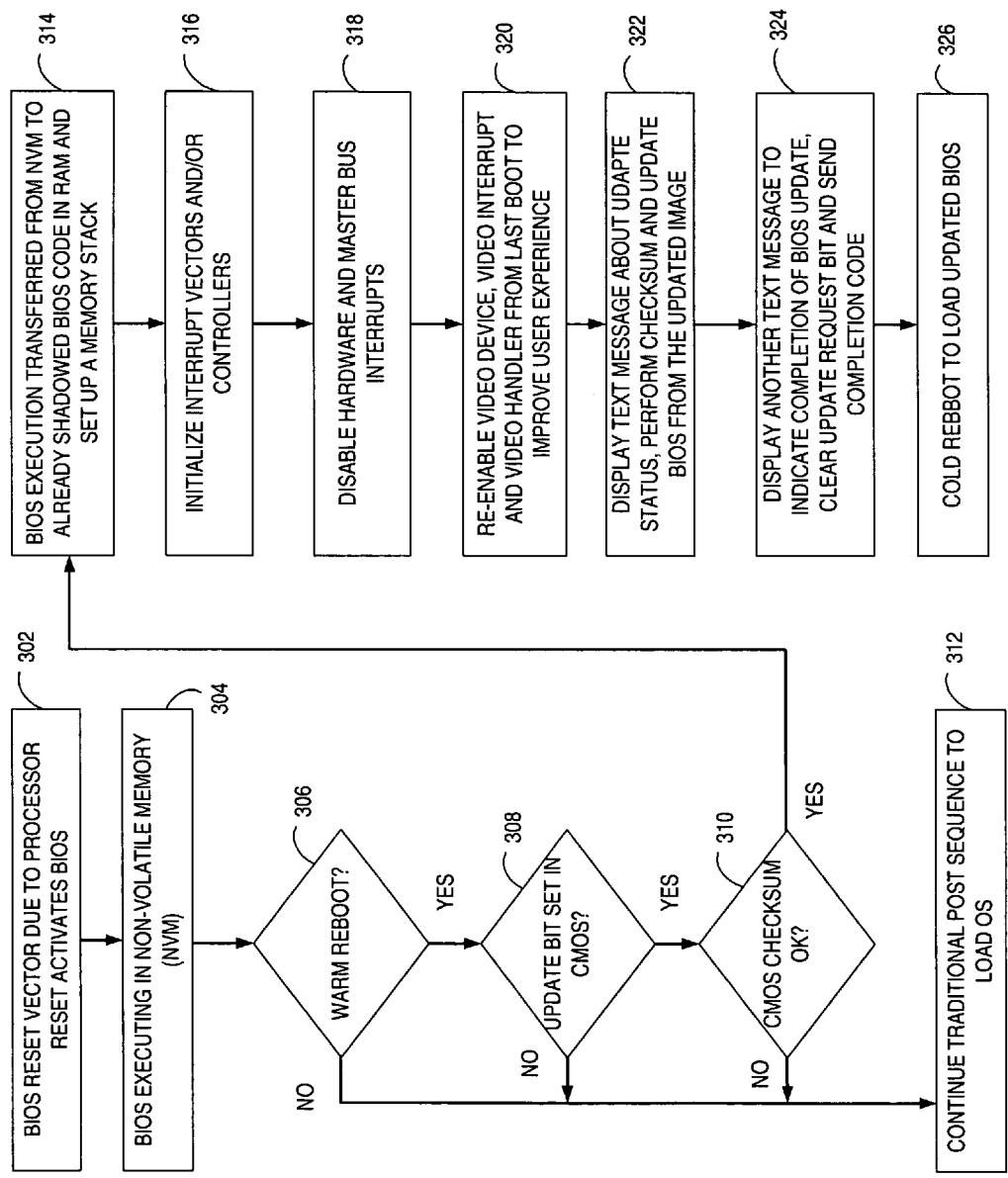
FIG. 3 is a flow chart illustrating a method for updating a BIOS of an IHS, according to an embodiment.

FIG. 3 is a flow chart illustrating a method for updating a BIOS of an IHS, according to an embodiment. In a particular embodiment, the BIOS is substantially the same as BIOS 180 and the IHS is substantially the same as the IHS 100 described with reference to FIG. 1. At step 302, code for the BIOS 180 stored in the NVM 122 is activated by a BIOS reset vector in response to a processor initialization or reset. Even though the processor is reset, many components of the IHS 100 are substantially in the same state prior to the processor reset. For example, contents of interrupt vectors, the RAM 120 and loading of device handlers is substantially preserved before and after the processor reset. At step 304, the BIOS 180 is executing from the NVM 122. At step 306, a determination is made whether the IHS is in a warm reboot. In a particular embodiment, step 306 is substantially similar to step 2162 described with reference to FIG. 2B. At step 308, in response to determining that the IHS 100 is in a warm reboot, a determination is made whether an RBU program or an RCI is requesting an update of the BIOS, e.g., by checking update bit set in AVNM 160. In a particular embodiment, step 308 is substantially similar to step 2164 described with reference to FIG. 2B. At step 310, in response to determining that the RBU or the RCI is requesting the update, a determination is made whether memory device storing the request has a valid checksum.

At step 312, in response to determining that the IHS 100 is not in a warm reboot, or there is no pending request for the update of the BIOS, or there is a checksum error, BIOS continues with the traditional POST sequence, which initializes the RAM 120 and is available to load the OS 122. At step 314, after verifying that the IHS 100 is in a warm reboot, and there is a pending request for the update of the BIOS, and there is no checksum error for the memory device storing the pending request indicator, BIOS transfers execution from the NVM 122 to the already-shadowed BIOS code in the RAM 120. The BIOS code is already in the RAM 120 due to the warm reboot. The BIOS also sets up a memory stack in the RAM 120 to perform additional operations. At step 316, interrupt vectors and/or interrupt controllers are re-initialized. In a particular embodiment, step 316 is substantially the same as the step 2182 described with reference to FIG. 2C. At step 318, hardware interrupts and PCI bus masters are disabled. In a particular embodiment, step 316 is substantially the same as the combined steps 2184 and 2186 described with reference to FIG. 2C.

At step 320, a video device is re-enabled and video interrupt (INT10h) is restored to the handler from the last boot to improve user experience. In a particular embodiment, step 320 is substantially the same as the step 2201 described with reference to FIG. 2D. At step 322, a text message is displayed advising about the update status and a checksum is performed on the RAM 120 to check the integrity of the updated image stored in the RAM 120. Upon verifying the checksum, the BIOS is updated by copying contents of the RAM 120 where the updated image is located to the NVM 122. At step 324, another text message is displayed indicating a completion status of the BIOS. In addition, the request update flag is cleared indicating there are no pending additional requests to update the BIOS and a completion code is sent to the RBU or RCI task requesting the update. At step 326, a cold reboot is performed thereby enabling the updated BIOS to be loaded from the NVM 122.

Various steps described above may be added, omitted, combined, altered, or performed in different orders. For example, an additional step may be added before step 310 to provide a UPS to the IHS 100. The UPS may advantageously insure the completion of the updating task of the BIOS 180 in the event of a power failure during the NVM updating process.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for updating a non-volatile memory (NVM) included in an information handling system (IHS), the method comprising:
    verifying a plurality of conditions permitting the updating of the NVM from a memory of the IHS;
    preserving contents of the memory;
    updating the NVM from the memory;
    resetting the IHS in response to the updating by enabling a cold reboot; and
    wherein verifying the plurality of conditions includes:
        verifying a warm report status of the IHS;
        verifying an update request bit set in another non-volatile memory (ANVM) of the IHS, the update request bit being indicative of a pending request to update the NVM from the memory; and
        verifying a checksum error status of the ANVM.

2. The method of claim 1, wherein the verifying of the warm reboot status is performed by:
    reading a predefined location in the memory; and
    verifying a match between contents stored at the predefined location and predefined data.

3. A method for updating a non-volatile memory (NVM) included in an information handling system (IHS), the method comprising:
    verifying a plurality of conditions permitting the updating of the NVM from a memory of the IHS;
    preserving contents of the memory;
    updating the NVM from the memory;
    resetting the IHS in response to the updating by enabling a cod reboot;
    providing a user interface, wherein the user interface is provided prior to the updating; and
    providing an output via the user interface, the output being indicative of a completion status of the updating.

4. The method of claim 3, wherein the providing of the user interface includes:
    enabling a display device; and
    enabling a video interrupt.

5. A method for updating a non-volatile memory (NVM) included in an information handling system (IHS), the method comprising:
    verifying a plurality of conditions permitting the updating of the NVM from a memory of the IHS;
    preserving contents of the memory;
    updating the NVM from the memory;
    resetting the IHS in response to the updating by enabling a cold reboot; and
    initializing interrupts capable of interrupting the updating;
    disabling the interrupts to prevent interruption of the updating; and
    disabling a bus master capable of changing the contents of the memory.

6. The method of claim 1, wherein the updating of the NVM is independent of a chipset included in the IHS.

7. The method of claim 1 further comprising:
    resetting a processor of the IHS, wherein the resetting of the processor causes the verifying of the plurality of conditions.

8. A method for updating a non-volatile memory (NVM) included in an information handling system (IHS), the method comprising:
    verifying a plurality of conditions permitting the updating of the NVM from a memory of the IHS;
    preserving contents of the memory;
    updating the NVM from the memory; and
    resetting the IHS in response to the updating by enabling a code reboot;
    wherein the application program included in the IHS is executable for:
        providing an updated image for the NVM;
        storing the updated image in the memory; and
        resetting a process of the ISH to initiate the updating of the NVM; and
    wherein the updated image includes updated configuration of the IHS.

9. The method of claim 8, wherein the updating of the NVM includes:
    validating integrity of the memory;
    uncompressing the updated image in the memory;
    storing the updated image in the NVM;
    setting a return code for the application program;
    providing a completion status output; and
    resetting at least one of the plurality of conditions.

10. The method of claim 1, wherein the cold reboot of the IHS enables updates made to the NVM to take effect.

11. An information handling system (IHS) comprising:
    a processor;
    a bus coupled to the processor;
    a memory coupled to the bus;
    an NVM coupled to the bus; and
    a basic input output system (BIOS) capable of updating the NVM, wherein the BIOS includes instructions for:

verifying a plurality of conditions permitting the updating of the NVM from the memory;
preserving contents of the memory;
updating the NVM from the memory;
resetting the processor by enabling a cold reboot; and
wherein the plurality of conditions include:
a warm reboot status;
an update request bit set in an ANVM coupled to the bus, the update request bit being indicative of a pending request to update the NVM from the memory; and
a checksum error status of the ANVM.

12. The system of claim 11, wherein the instructions are substantially independent of a chipset included in the IHS.

13. The system of claim 11, wherein the warm reboot status is determined by reading a predefined location in the memory and determining whether contents stored at the predefined location match predefined data.

14. The system of claim 11 further comprising:
a user interface coupled to the bus, wherein the user interface is provided prior to the updating; and
an output via the user interface, the output being indicative of a completion status of the updating.

15. The system of claim 12, wherein a reset of the processor causes an execution of the instructions to update the NVM.

* * * * *